Patented June 21, 1949

2,474,193

UNITED STATES PATENT OFFICE 2,474,193

CALCIUM SILICATE PHOSPHOR

James H. Schulman, Cambridge, Mass., assignor to Sylvania Electric Products Inc., Salem, Mass., a corporation of Massachusetts No Drawing. Application August 29, 1945, Serial No. 613,424

5 Claims. (Cl. 252—301.4)

This invention relates to fluorescent materials, usually called phosphors, and particularly to such materials for use in fluorescent lamps.

An object of the invention is to provide a bright material of small particle size for use in such lamps. A further object is to produce such a material cheaply, and still another object is to produce a fluorescent material which will maintain good brightness throughout the life of the lamp.

A feature of the invention is a fluorescent material of small particle size activated at least partly by lead, and a particular feature is the introduction of the lead in the form of a fluoride.

Earlier experimenters have made fluorescent materials activated with lead, but they have introduced the lead in the form of compounds such as oxides or chlorides which, although they gave a material of reasonable brightness, caused it to have large particle size, which required too much of the material per lamp. My invention gives very small particle size together with good brightness, and may be produced at lower temperatures than those required without the lead fluoride. Fluorescent materials are ordinarily fired at high temperatures before use, and the lead fluoride is added before firing. The lead appears to remain in the phosphor as an activator, while the fluorine is lost during the firing, serving as a vapor catalyst to keep the particle size small.

Particular features of the invention are calcium manganese lead silicate, zinc lead manganese silicate, zinc beryllium lead manganese silicate, and calcium lead tungstate, in which the lead is added as a fluoride prior to firing.

In preparing the calcium silicate fluorescent material according to the invention, I may, for example, mix 1 mol of calcium carbonate, 1.2 mols of silica, 0.066 mol of manganese carbonate, and 0.0078 mol of lead fluoride. The materials used should be finely powdered and of the purest grade obtainable, and should be especially free of iron.

The components in the above proportions may be wet pebble-milled for about 15 hours, filtered, dried for about the same length of time at 110° C. and then hammer milled. The hammer-milled blend may then be fired in open trays for about 6 hours at 2100° F. This will often be sufficient firing, but to insure high brightness the powder may be again hammer milled, if desired, and refired in open trays for 6 more hours at 2100° F. It may then be lightly crushed in a mortar or rolled out.

The resultant powder will fluoresce uniformly pink when excited by the mercury 2537 A. radiation. If a mixture is made of about 4% zinc orthosilicate, manganese-activated, and 20% magnesium tungstate, and the remainder calcium silicate, lead and manganese activated, prepared as above described, and coated onto the inside of a "40 watt, T12" lamp tube, which is 1½ inch in diameter and 48 inches long, about 2.1 grams will be required. The proportions of the various phosphors in the mixture will vary with their particle size, brightness and the like, but the blending proportions for the proper fluorescent color may be easily determined by experiment. The resultant coated tube, with electrodes sealed to its ends, after being exhausted, filled with argon gas at a few millimeters pressure and a drop of mercury in the usual manner and sealed, will give a good daylight color of emitted light when operated in the usual manner. One such lamp, with oxide-coated thermionic electrodes had an efficiency of 49.4 lumens per watt initially, and 47.6 lumens per watt at 100 hours, the time at which the measurements for rating are taken. This was well above the rating of 45.0 lumens per watt for such a daylight lamp at 100 hours.

A somewhat less reddish powder may be made by decreasing the manganese carbonate content to 0.044 mol. I have found that about 2.2 g. of such a powder will be used in coating a 40 watt T12 lamp to the usual opacity, and that the completed lamp will have an efficiency of about 49 L. P. W. (lumens per watt) or more, initially and 44 or more at the usual 100 hours rating time.

Increasing the firing temperature increased the weight of powder needed per bulb to 2.7 g. but improved the 100 hour efficiency to 46 L. P. W. The upper limit of the manganese activator is about .088 mol.

With 0.0025 mol lead fluoride, the fluorescence was weak and with 0.025, although the fluorescence was very bright, the particle size was very coarse, even when fired at 1920° F. A value of 0.0078 mol has been found to be very good. The foregoing tests were made in open trays 10″ x 7″ x 1″. Firing in a covered vessel was less effective, and would probably require smaller amounts of the fluoride, because of smaller loss of fluorine in firing.

The fluorine in the fluoride appears to be completely lost in firing, and no indication of its presence in the finished material is obtained on analysis. The lead, however, definitely remains in the phosphor, and is necessary to its proper fluorescence.

The calcium silicate, doubly-activated as described, has one peak in its fluorescent emission in the red portion of the spectrum, and a separate peak in the ultraviolet extending upward to the blue so that the powder has a small blue fluorescence in addition to its red.

Zinc silicates and zinc beryllium silicates, manganese-activated are well known. However, I find that if a small amount of lead fluoride, say about 0.1% by weight, is added to the usual components prior to firing, an improved material, of lower particle size, results.

Calcium tungstate, activated with lead, is well known. However, I find that if the lead is added as a fluoride, prior to firing, the final particle size after firing is also reduced.

What I claim is:

1. A powdered mixture for making a fluorescent calcium silicate which consisting essentially of about 1 mol of a calcium compound selected from the group consisting of the oxides and those compounds which decompose on heating to form the oxides, about 1.2 mols of silica, between about .044 and .088 mol of a manganese activator, and between about .0025 mol to about .025 mol of lead fluoride.

2. A powdered mixture for making a fluorescent calcium silicate which consisting essentially of about 1 mol of calcium carbonate, about 1.2 mols of silica, between about .044 and .088 mol of manganese carbonate and about .0078 mol of lead fluoride.

3. The method of making fluorescent calcium silicate which comprises: mixing about 1 mol of calcium carbonate, about 1.2 mol of silica, about .066 mol of manganese carbonate and about .0078 mol of lead fluoride; wet pebble-milling this mixture for about 15 hours; filtering the mixture; drying the mixture; hammer milling the mixture; and firing the mixture for about 6 hours at between 1920° F. to 2100° F.

4. A calcium silicate fluorescent material prepared by mixing about 1 mol of a calcium compound selected from the group consisting of the oxides and those compounds which decompose on heating to form the oxides, about 1.2 mols of silica, between about .044 and .088 mol of a manganese activator and between about .0025 mol to about .025 mol of lead fluoride; wet pebble-milling this mixture for about 15 hours; filtering the mixture; drying the mixture; hammer milling the mixture; and firing the mixture for about 6 hours at between 1920° F. to 2100° F.

5. A calcium silicate fluorescent material prepared by mixing about 1 mol of calcium carbonate, about 1.2 mols of silica, between about .044 and .088 mol of manganese carbonate and between about .0025 mol to about .025 mol of lead fluoride; wet pebble-milling this mixture for about 15 hours; filtering the mixture; drying the mixture; hammer milling the mixture; and firing the mixture for about 6 hours at between 1920° F. to 2100° F.

JAMES H. SCHULMAN.

REFERENCES CITED

The following references are of record in the file of this patent:

UNITED STATES PATENTS

| Number | Name | Date |
|---|---|---|
| 1,237,368 | Muller | Aug. 21, 1917 |
| 2,254,956 | Aschermann | Sept. 2, 1941 |
| 2,299,510 | Steadman | Oct. 20, 1942 |
| 2,312,266 | Roberts | Feb. 23, 1943 |